United States Patent
Yamamoto et al.

(10) Patent No.: US 11,042,329 B2
(45) Date of Patent: Jun. 22, 2021

(54) REORDERING A SEQUENCE OF FILES BASED ON COMPRESSION RATES IN DATA TRANSFER

(71) Applicant: International Business Machines Corporation, Armonk, NY (US)

(72) Inventors: Noriko Yamamoto, Tokyo (JP); Tsuyoshi Miyamura, Yokohama (JP); Hiroshi Itagaki, Yokohama (JP); Tohru Hasegawa, Tokyo (JP); Shinsuke Mitsuma, Machida (JP)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 16/418,609

(22) Filed: May 21, 2019

(65) Prior Publication Data

US 2020/0371720 A1    Nov. 26, 2020

(51) Int. Cl.
*G06F 3/06* (2006.01)
*G06F 12/0871* (2016.01)
*G11B 20/00* (2006.01)

(52) U.S. Cl.
CPC .......... *G06F 3/0682* (2013.01); *G06F 3/0608* (2013.01); *G06F 3/0613* (2013.01);
(Continued)

(58) Field of Classification Search
CPC .......... G06F 12/0871; G06F 2212/213; G06F 2212/401; G06F 3/0608; G06F 3/0613;
(Continued)

(56) References Cited

U.S. PATENT DOCUMENTS 6,301,394 B1 * 10/2001 Trout ................ H03M 7/30
341/51
6,879,266 B1 * 4/2005 Dye ................ G06F 12/08
341/51

(Continued)

FOREIGN PATENT DOCUMENTS

JP    2010519756 A    6/2010
WO   2010004936 A1   1/2010

OTHER PUBLICATIONS

"3592 tape drives", IBM Knowledge Center, Last printed May 15, 2019, 4 pages, <https://www.ibm.com/support/knowledgecenter/en/STQRQ9/com.ibm.storage.ts4500.doc/ts4500_ipg_drives_3592.html>.

(Continued)

*Primary Examiner* — Paul M Knight
(74) *Attorney, Agent, or Firm* — Edward Li

(57) ABSTRACT

A computer-implemented method, a computer program product, and a computer system for reordering a sequence of files based on compression rates in data transfer. A host determines predicted compression rates of first files that are to be saved onto a first tape, based on a relationship between compression rates and file attributes of second files that have been saved on a second tape. The host reorders a sequence of the first files stored in host cache storage and generates a new sequence of transferring the first files from the host cache storage to the tape drive hosting the first tape, based on the predicted compression rates of the first files. The host transfers the first files to the tape drive hosting the first tape and writes the first files to the first tape, according to the new sequence.

20 Claims, 9 Drawing Sheets

(52) U.S. Cl.
CPC .......... *G06F 3/0619* (2013.01); *G06F 3/0656* (2013.01); *G06F 12/0871* (2013.01); *G06F 2212/213* (2013.01); *G06F 2212/401* (2013.01); *G11B 20/00007* (2013.01)

(58) Field of Classification Search
CPC .... G06F 3/0619; G06F 3/0635; G06F 3/0656; G06F 3/0682; G11B 20/00007
See application file for complete search history.

(56) References Cited

U.S. PATENT DOCUMENTS

| | | | |
|---|---|---|---|
| 9,329,787 B2 | 5/2016 | Katagiri | |
| 9,377,961 B2 | 6/2016 | McCarty | |
| 9,423,968 B2 | 8/2016 | Ohta | |
| 10,069,896 B2 | 9/2018 | Freitag | |
| 2008/0320361 A1 | 12/2008 | Fukuda | |
| 2013/0326170 A1* | 12/2013 | Kilari | G06F 3/0679 |
| | | | 711/161 |
| 2015/0199132 A1* | 7/2015 | Fujihara | G06F 3/0643 |
| | | | 711/111 |
| 2015/0309738 A1* | 10/2015 | Katagiri | G11B 27/36 |
| | | | 369/47.28 |

OTHER PUBLICATIONS

"Data Interchange on 12,7 mm 384-Track Magnetic Tape Cartridges—Ultrium-1 Format", ECMA Standardizing Information and Communication Systems, Standard ECMA-319 Jun. 2001. 58 pages. <https://www.ecma-international.org/publications/files/ECMA-ST/ECMA-319.pdf>.

"IBM® TotalStorage® LTO Ultrium Tape Drive", SCSI Reference GA32-0928-03, Third Edition, Oct. 24, 2017, 546 pages, <https://www-01.ibm.com/support/docview.wss?uid=ssg1S7003556&aid=1>.

"PCIe3 FPGA Compression Accelerator Adapter (FC EJ13; CCIN 59AB)". IBM Knowledge Center, Last updated Mar. 14, 2019, 3 pages, <https://www.ibm.com/support/knowledgecenter/en/POWER8/p8hcd/fcej13.htm>.

* cited by examiner

REORDERING A SEQUENCE OF FILES BASED ON COMPRESSION RATES IN DATA TRANSFER

BACKGROUND

The present invention relates generally to data transfer to a tape drive and data write to a tape media, and more particularly to reordering a sequence of files based on compression rates in data transfer.

The data transfer speed (connection speed) from a host to a tape drive through interfaces (such as Fibre Channel and SAS) is at least two times the speed (native data transfer speed) at which data is written to a magnetic tape by a tape head. A tape drive has a function to compress data internally and is capable of compressing and storing transferred data. Data from the host is compressed with error checking on the tape drive. The compressed data is put together in a data set and temporarily stored in the ring buffer memory, and then it is written from the buffer memory to the tape. An IBM® TS1150 tape drive has native data transfer speed of 360 MB/s and burst data transfer speed of 800 MB/s with a Fibre Channel interface.

If the transferred data has already been compressed, there will be no room to further compress the transferred data even if the tape drive attempts to do so. In such a case, even when the host interface attempts to transfer data at the maximum speed (e.g., 800 MB/s), a data write to a magnetic tape medium only takes place at the maximum speed (e.g., 360 MB/s) of the native data transfer speed. As a result, the data buffer of the tape drive becomes full and, on average, data transfer will take place from the host to the drive at the maximum speed of the native data transfer speed (e.g., 360 MB/s), which is not more than the half of the maximum speed of data transfer (e.g., 800 MB/s) with a Fibre Channel interface. Therefore, it is difficult to fully exploit the capability of data transfer speed (connection speed) from a host to a tape drive through interfaces. For example, IBM® TS1150 has 2-GB data buffer and the buffer will become full in several seconds.

In contrast, there may also be a case where the connection speed is slow and the native data transfer speed is not fully exploited. For example, if the data to be stored only includes pieces of text data that can be readily compressed, then these pieces of data are transferred from the host at the maximum speed but the compression of them will take place on the side of the tape drive, so that writing to a tape medium will not reach the maximum speed of native data transfer. As a result, the media may be written at a low speed by speed matching, and the maximum speed of native data transfer may not be utilized.

The connection speed of the tape drives currently released by IBM® is 8 Gbps. As the interface has been evolving in recent years, 16 Gbps and 32 Gbps Fibre Channel host bus adapter (HBAs) have already been available on the market. While the native data transfer speed of the tape drive has been increased as well, rapid increase in the native data transfer speed is not expected. As Fibre Channel connection speeds increase, the tape drive remains a slow interface. There is no reason to change to a faster Fibre Channel interface while the tape drive remains a low-speed interface.

The Linear Tape File System (LTFS) is a file system for a tape that can be commonly used on various operating systems such as Windows®, MacOS®, Linux®, etc. A tape is a storage medium suitable for long-term storage. The operating systems may change when the data saved on the tape is read in the future. Even if a host is changed, it is necessary for the host to be able to read the data. For this reason, hardware compression and decompression in a tape drive are used.

Data compression includes various compression methods, such as well-known ZIP, LZ4, and system-dependent hardware compression. If the performance of the host is improved, the data compression and decompression may be in some cases more efficient if they are implemented on the side of the host. However, in a case where a tape drive is to be used on the LTFS as an open storage system, compression by the host may cause a problem—data cannot be read by a system that only supports a different compression method. Also, with the advancement of the system's performance, CPU performances of tape drives also be updated and tape drives are equipped with hardware compression engines, so that the speed of compression of the tape drives have also been improved. Because of these facts, there has been a need to implement data compression on a tape drive.

SUMMARY

In one aspect, a computer-implemented method for reordering a sequence of files based on compression rates in data transfer is provided. The computer-implemented method includes determining, by a host, predicted compression rates of first files that are to be saved to a first tape, based on a relationship between compression rates and file attributes of second files that have been saved on a second tape, wherein the predicted compression rates are expected to be achieved by compression on a tape drive hosting the first tape. The computer-implemented method further includes reordering, by the host, a sequence of the first files stored in host cache storage, to generate a new sequence of transferring the first files from the host cache storage to the tape drive hosting the first tape, based on the predicted compression rates of the first files. The computer-implemented method further includes transferring, by the host, the first files from the host cache storage to the tape drive hosting the first tape, according to the new sequence. The computer-implemented method further includes writing, by the host, the first files to the first tape, according to the new sequence.

In another aspect, a computer program product for reordering a sequence of files based on compression rates in data transfer is provided. The computer program product comprising one or more computer-readable tangible storage devices and program instructions stored on at least one of the one or more computer-readable tangible storage devices. The program instructions are executable to: determine, by a host, predicted compression rates of first files that are to be saved to a first tape, based on a relationship between compression rates and file attributes of second files that have been saved on a second tape, wherein the predicted compression rates are expected to be achieved by compression on a tape drive hosting the first tape; reorder, by the host, a sequence of the first files stored in host cache storage, to generate a new sequence of transferring the first files from the host cache storage to the tape drive hosting the first tape, based on the predicted compression rates of the first files; transfer, by the host, the first files from the host cache storage to the tape drive hosting the first tape, according to the new sequence; write, by the host, the first files to the first tape, according to the new sequence.

In yet another aspect, a computer system for reordering a sequence of files based on compression rates in data transfer is provided. The computer system comprises one or more processors, one or more computer readable tangible storage devices, and program instructions stored on at least one of the one or more computer readable tangible storage devices for execution by at least one of the one or more processors. The program instructions are executable to determine, by a host, predicted compression rates of first files that are to be saved to a first tape, based on a relationship between compression rates and file attributes of second files that have been saved on a second tape, wherein the predicted compression rates are expected to be achieved by compression on a tape drive hosting the first tape. The program instructions are further executable to reorder, by the host, a sequence of the first files stored in the host cache storage, to generate a new sequence of transferring the first files from the host cache storage to the tape drive hosting the first tape, based on the predicted compression rates of the first files. The program instructions are further executable to transfer, by the host, the first files from the host cache storage to the tape drive hosting the first tape, according to the new sequence. The program instructions are further executable to write, by the host, the first files to the first tape, according to the new sequence.

DETAILED DESCRIPTION

Figure 1:
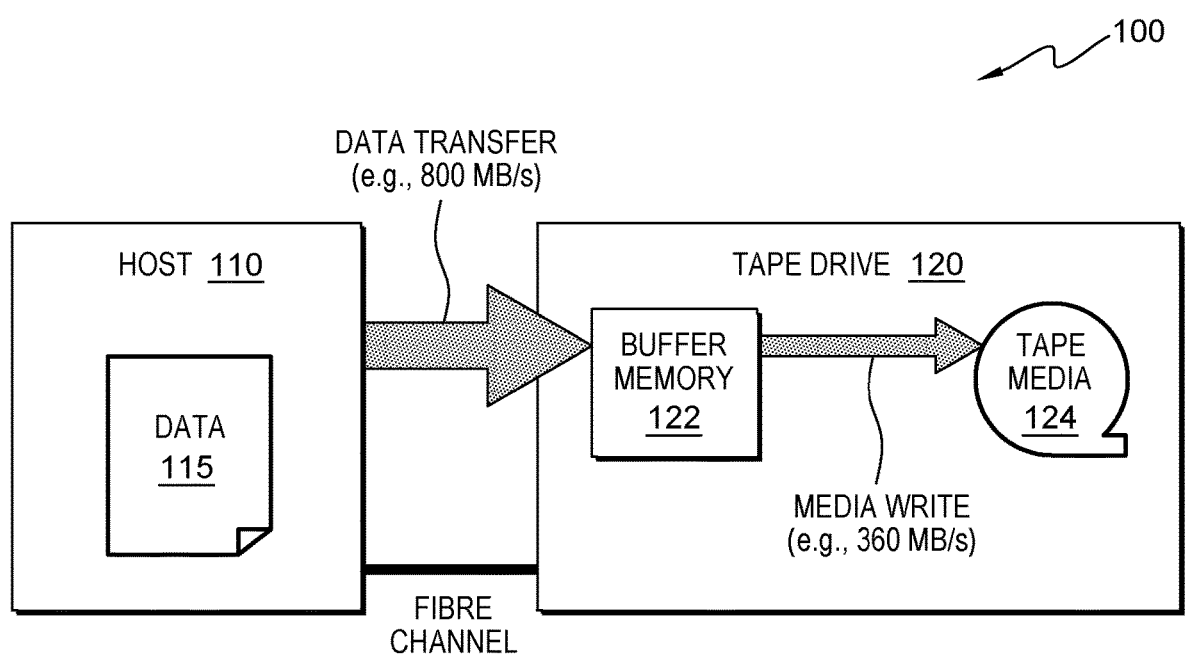
FIG. 1 is a diagram illustrating a difference between a transfer speed from a host to a tape drive and a write speed to a tape.

FIG. 1 is a diagram illustrating a difference between a transfer speed from a host to a tape drive and a write speed to a tape. FIG. 1 shows host 110 and tape drive 120. Tape drive 120 comprises buffer memory 122 and tape medium 124. Host 110 and tape drive 120 are connected by the Fibre Channel. The data transfer speed (or connection speed) of data 115 from host 110 to buffer memory 122 on tape drive 120 through the interface (Fibre Channel) is at least two times data write speed (or native data transfer speed) from buffer memory 122 to tape medium 124. For example, the native data transfer speed is 360 MB/s while the data transfer speed is 800 MB/s.

Embodiments of the present invention disclose an approach to analyzing data compression rates of data that is to be saved to a tape medium. If the data compression rates of the to-be saved data are unbalanced on a host cache, the disclosed approach shortens the time to save data to the tape medium by mixing files with a higher compression rates and files with a lower compression rates and reordering the files.

Embodiments of the present invention disclose an approach that efficiently uses connection speed (or data transfer speed from a host to a tape drive) and native data transfer speed (or data write speed to a tape media). In this disclosed approach, speed of a host bus adapter supports maximum speed of a host interface of a tape drive, and a data storage device of the host has sufficient speed with a memory device and redundant array of independent disks (RAID), so that data transfer bottleneck does not exits.

The compression rate of data is calculated in the following manner.

$$\text{Compression rate } (\%) = \frac{\text{Data size after compression}}{\text{Data size before compression}} \times 100$$

Readily-compressible data is data whose size is significantly reduced after compression and has a low compression rate (e.g., compression rate equal to 20%). Not-readily-compressible data is data whose size is hardly reduced and has a large compression rate (e.g., compression rate equal to 80%).

In embodiments of the present invention, in order to fully take advantage of compression capability of a tape drive, a host checks compression rates of files that are to be written on a tape, mixes files with high compression rates and files with low compression rates, rearranges a sequence of writing the files to the tape, and transfers the files from the host to the tape drive according to the sequence. Thus, advantages of both connection speed (data transfer speed) and native data transfer rates (or the data write speed) are fully taken.

For example, with an IBM® TS1150 tape drive, a ratio of the native data transfer speed to the connection speed is about 1:2.2. With the compression rate of 45% of a file, advantages of both the native data transfer speed and the connection speed can be taken. However, files that have already been compressed (such as files with extensions .zip, .lzh, etc.) do not require much compression on tape drives. Text data may be compressed to about 20% of its original size. If pieces of data having the same compression rate are successively saved, it is not possible to take advantage of the transfer speed. Therefore, the compression rates of files to be transferred to the tape drive needs to be predicted prior to actual data transfer, and the order of data transfer needs to be modified such that the compression rate becomes close to 45%.

Figure 2:
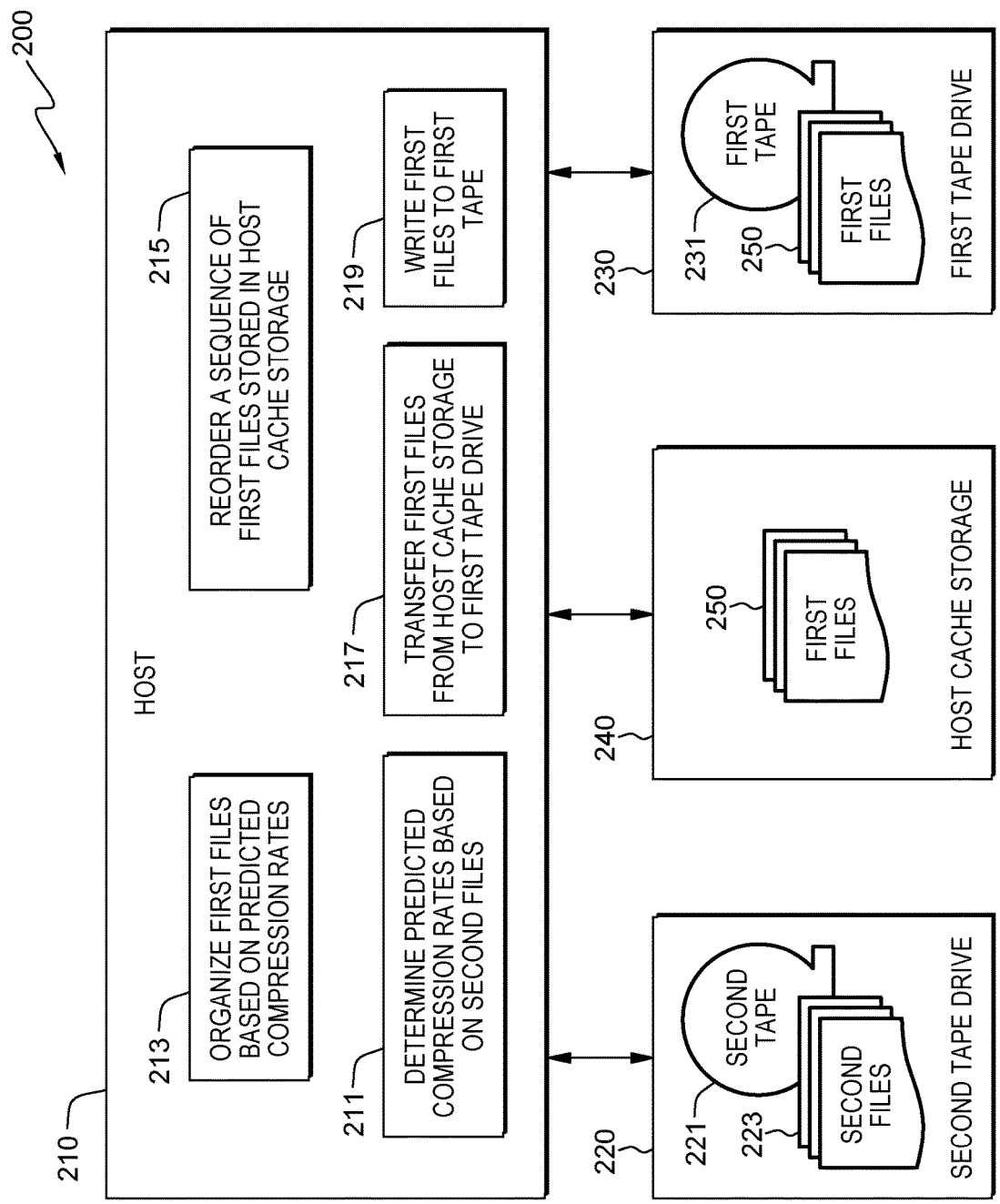
FIG. 2 is a systematic diagram illustrating a system of reordering a sequence of files based on compression rates in data transfer, in accordance with one embodiment of the present invention.

FIG. 2 is a systematic diagram illustrating system 200 of reordering a sequence of files based on compression rates in data transfer, in accordance with one embodiment of the present invention. System 200 comprises host 210. Host 210 is a computing system capable of receiving input from a user, executing computer program instructions, and communicating with another computing system via a network. The computing system is described in more detail in later paragraphs with reference to FIG. 11.

System 200 further comprises host cache storage 240. In one embodiment, as shown in FIG. 2, host cache storage 240 is connected to host 210. In another embodiment, host cache storage 240 is situated on host 210. First files 250 stored on host cache storage 240 are to be written from host cache storage 240 to first tape 231 hosted by first tape drive 230. After reordering a sequence of first files 250 stored on host cache storage 240 and generating a new sequence of transferring from host cache storage 240 to first tape drive 230, host 210 transfers first files 250 from host cache storage 240 to first tape drive 230, and then writes first files 250 to first tape 231.

System 200 further comprises second tape 221 hosted by second tape drive 220. Host 210 determines predicted compression rates of first files 250, based on a relationship between compression rates and file attributes of second files 223 that have been stored on second tape 221. The predicted compression rates of first files 250 are compression rates that are expected to be achieved by compression on first tape drive 230. The predicted compression rates of first files 250 are used when host 210 reorders a sequence of first files 250 stored in host cache storage 240.

Host 210 comprises one or more processors, one or more computer readable tangible storage devices, and program instructions which are stored on at least one of the one or more computer readable tangible storage devices and executed by at least one of the one or more processors. As shown in block 211, the program instructions are executable to determine the predicted compression rates of first files 250 that are to be written onto first tape 231, based on a relationship between compression rates and file attributes of second files 223 that have been saved on second tape 220. As shown in block 213, the program instructions are further executable to organize first files 250, based on the predicted compression rates. As shown in block 215, the program instructions are further executable to reorder a sequence of first files 250 stored in host cache storage 240 and to generate a new sequence of transferring first files 250 from host cache storage 240 to first tape drive 230. As shown in block 217, the program instructions are further executable to transfer first files 250 from host cache storage 240 to first tape drive 230 according to the new sequence. As shown in block 219, the program instructions are further executable to write first files 250 to first tape 231 according to the new sequence.

It should be understood that first tape drive 230 and second tape drive 220 may be a same tape drive. It should also be understood that first tape 231 and second tape 221 may be a same tape. It should also be understood that first files 250 may be written onto a same tape storing second files 223. It should also be understood that both first tape 231 and second tape 221 may be hosted by a same tape drive.

Figure 3:
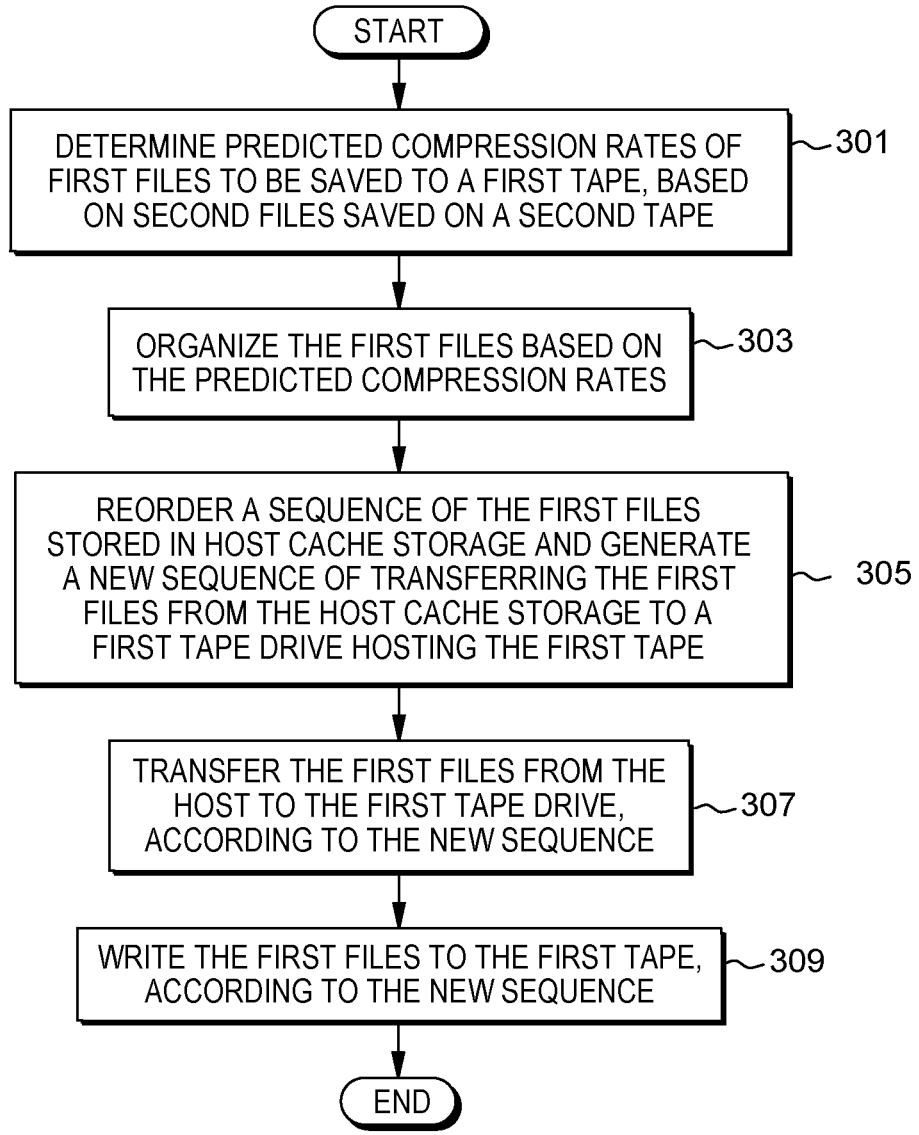
FIG. 3 presents a flowchart showing operational steps of reordering a sequence of files based on compression rates in data transfer, in accordance with one embodiment of the present invention.

FIG. 3 presents a flowchart showing operational steps of reordering a sequence of files based on compression rates in data transfer, in accordance with one embodiment of the present invention. At step 301, a host determines predicted compression rates of first files that are to be saved to a first tape, based on a relationship between compression rates and file attributes of second files that have been saved on a second tape. For example, in the embodiment shown in FIG. 2, host 210 determines predicted compression rates of first files 250 that are to be saved to first tape 230. The predicted compression rates of the first files are expected to be achieved by compression on a first tape drive hosting the first tape.

Referring to FIG. 3, at step 303, the host organizes the first files stored in host cached storage, based on the predicted compression rates which are determined at step 301. For example, in the embodiment shown in FIG. 2, host 210 organizes first files 250 stored in host cache storage 240, based on the predicted compression rates. Organizing the first files based on the predicted compression rates is described in detail in later paragraphs with reference to FIG. 5.

Referring to FIG. 3, at step 305, the host reorders a sequence of the first files stored in the host cache storage and generates a new sequence of transferring the first files from the host cache storage to a first tape drive hosting the first tape, based on the predicted compression rates of the first files. For example, in the embodiment shown in FIG. 2, host 210 reorders a sequence of first files 250 stored in host cache storage 240 and generates a new sequence transferring first files 250 from host cache storage 240 to first tape drive 230 where first tape 231 is hosted. Reordering a sequence of the first files stored in the host cache storage and generating a new sequence of transferring the first files from the host cache storage to the first tape drive are described in detail in later paragraphs with reference to FIG. 6.

Referring to FIG. 3, at step 307, the host transfers the first files from the host cache storage to the first tape drive, according to the new sequence generated at step 305. For example, in the embodiment shown in FIG. 2, host 210 transfers first files 250 from host cache storage 240 to first tape drive 230, according to the new sequence. At step 309, host writes the first files to the first tape, according to the new sequence. For example, in the embodiment shown in FIG. 2, host 210 writes first files 250 to first tape 231, according to the new sequence. By using the new sequence to transfer the first files from the host cache storage to the first tape drive and write the first files to the first tape, the advantages of both data transfer speed to a tape drive and data write speed to a tape media are fully taken.

It should also be understood that both first files and the second files may be written to a same tape—to either the first tape or the second tape. It should be understood that the first tape and the second tape may be hosted by a same tape drive.

Figure 4:
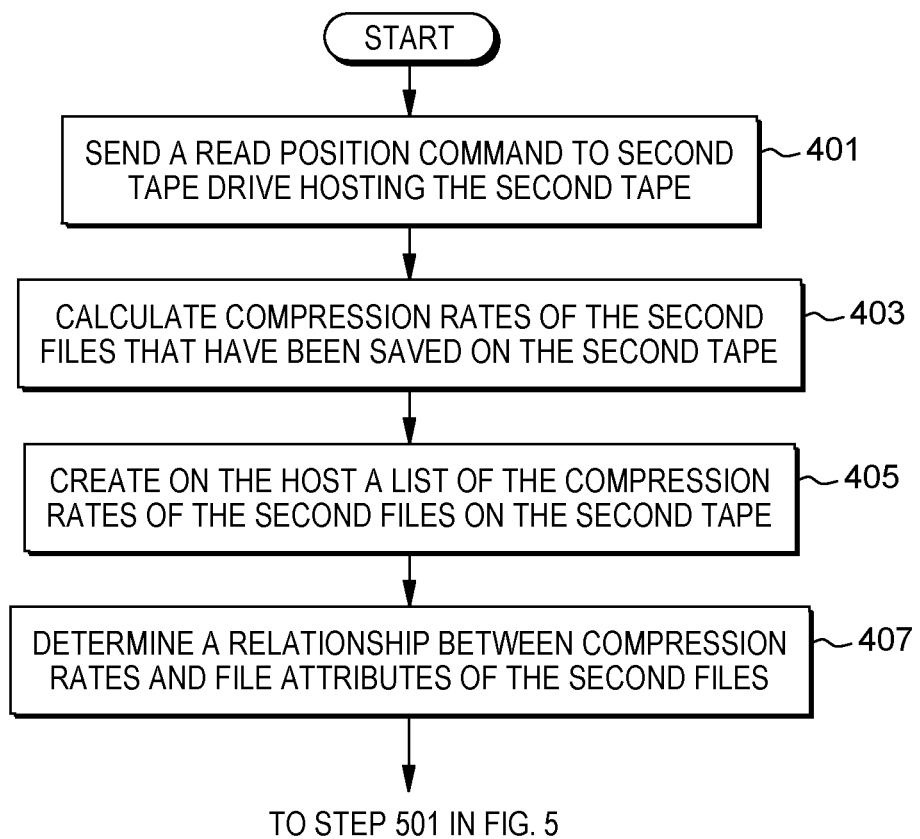
FIG. 4 presents a flowchart showing operational steps of determining a relationship between compression rates and file attributes of files that have been saved on a tape, in accordance with one embodiment of the present invention.

FIG. 4 presents a flowchart showing operational steps of determining a relationship between compression rates and file attributes of files that have been saved, in accordance with one embodiment of the present invention.

Referring to FIG. 4, at step 401, the host sends a SCSI (Small Computer System Interface) Read Position command to a second tape drive hosting the second tape. For example, in the embodiment shown in FIG. 2, host 210 sends the SCSI Read Position command to second tape drive 220 hosting second tap 221. The host sends the SCSI Read Position command to the second tape drive before and after each of the second files is written to the second tape. How many data sets have been written can be calculated, based on the data set number that has been acquired.

Referring to FIG. 4, at step 403, the host calculates compression rates of the second files that have been saved on the second tape. For example, in the embodiment shown in FIG. 2, host 210 calculates the compression rates of second files 223 that have been written on the second tape 221. The compression rates are calculated based on the amount of data that has been transferred from the host to the second tape drive and the amount of data on the tape drive derived from the data set number.

Referring to FIG. 4, at step 405, the host creates on the host a list of the compression rates of the second files. For example, in the embodiment shown in FIG. 2, host 210 creates on host 210 a list of the compression rates of second files 223. The compression rates are saved as a list on the host along with identifiers and attributes (e.g., file name, extension, time, etc.) of the second files. Table 1 shows an example of the compression rates calculated from dataset counts on the second tape.

TABLE 1

| File Name | Sizes before Compression (MB) | Dataset Counts on the Tape | Sizes after Compression on the Tape (MB) | Compression Rates (%) |
|---|---|---|---|---|
| FileA.html | 256 | 53 | 53 | 20.7 |
| FileB.jpg | 896 | 705 | 705 | 78.7 |
| FileC.bmp | 1075 | 666 | 666 | 62.0 |
| FileD.exe | 23129 | 9201 | 9201 | 39.8 |
| FileE.doc | 506 | 298 | 298 | 59.0 |
| FileF.txt | 353 | 106 | 106 | 30.0 |
| FileG.tar | 199410 | 103693 | 103693 | 52.0 |
| FileH.txt | 1791 | 663 | 663 | 37.0 |
| FileI.jpg | 331 | 274 | 274 | 82.8 |
| ... | ... | ... | ... | ... |

* In case of one dataset on the tape is 1 MB.

Referring to FIG. 4, at step 407, the host determines a relationship between the compression rates and the file attributes of the second files. For example, in the embodiment shown in FIG. 2, host 210 determines the relationship between the compression rates and the file attributes of second files 223. The relationship between the compression rates and the file attributes is analyzed and relevance is extracted. For example, if the files are successive ones or have the same attributes and past variations in their compression rates fall within a predetermined range, then it is assumed that the files that will be saved from now onward will have the same or similar level of compression rates. The relationship between the files and the compression rates is given as R(f) (where f indicates a file identifier or attribute). Table 2 shows an example of the relationship between the compression rates and file extensions as the file attributes. It is noted that the file attributes are not limited to file extensions shown in the example.

TABLE 2

| File Extensions | Compression Rates (%) |
|---|---|
| exe | 40 |
| doc | 60 |
| txt | 33 |
| tar | 50 |
| html | 20 |
| jpg | 80 |
| bmp | 60 |
| ... | ... |

Figure 5:
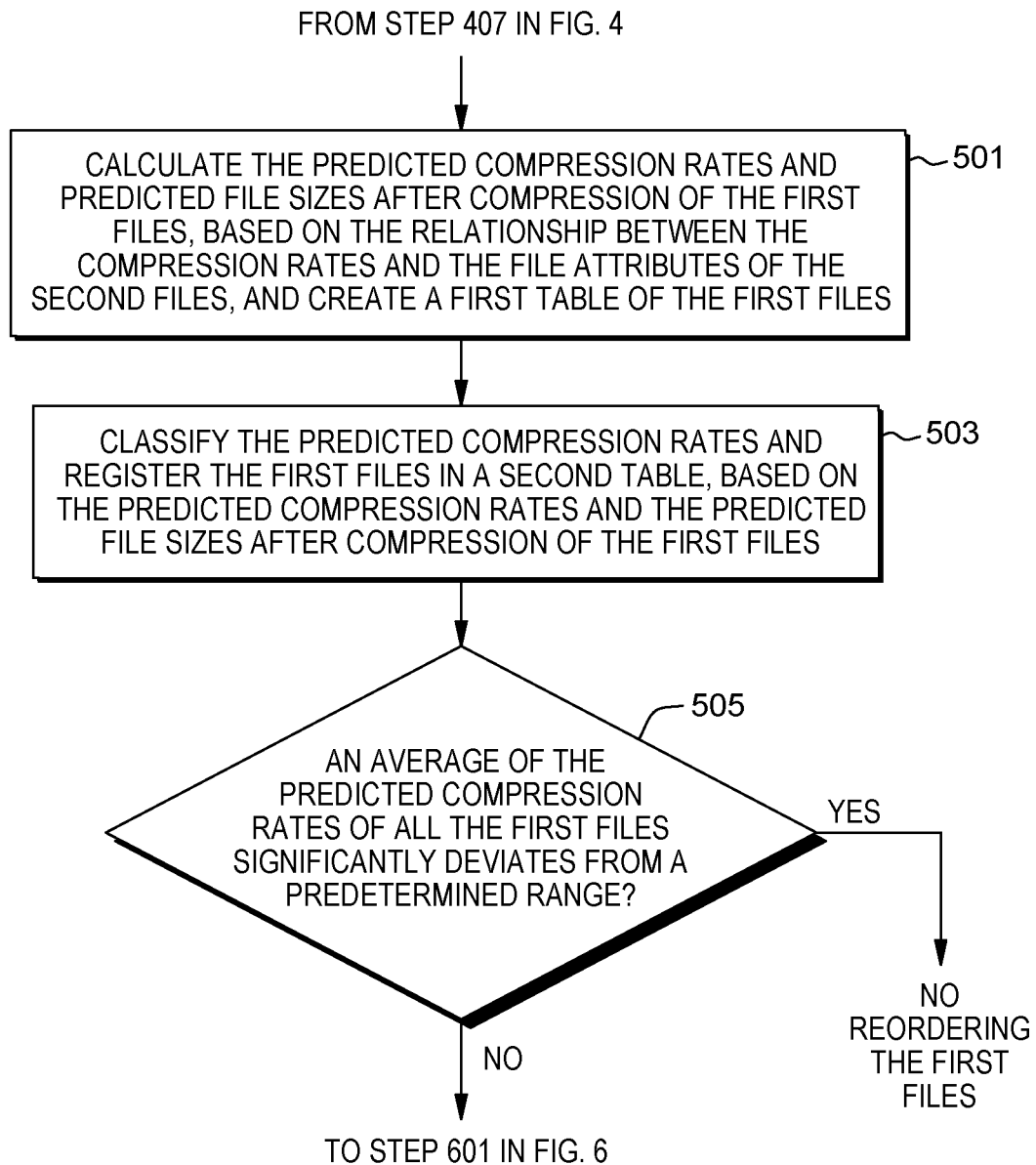
FIG. 5 presents a flowchart showing operational steps of organizing files to be saved based on predicted compression rates, in accordance with one embodiment of the present invention.

FIG. 5 presents a flowchart showing operational steps of organizing files to be saved based on predicted compression rates, in accordance with one embodiment of the present invention.

First files newly stored in the host cache storage connected to the host are to be backed up to the first tape. The host cache storage includes a large capacity RAID of hard disks generally; however, memory and flash disks can also be used. The first files are organized in accordance with their predicted compression rates which are obtained by using the relationship between the compression rates and the file attributes of the second files.

Referring to FIG. 5, at step 501, the host calculates the predicted compression rates and predicted file sizes after compression of the first files, based on the relationship between the compression rates and the file attributes of the second files, and creates on the host a first table of the first files. The relationship is determined through steps 401-407 shown in FIG. 4. For example, in the embodiment shown in FIG. 2, host 210 calculates the predicted compression rates and the predicted file sizes of first files 250, based on the relationship developed from second files 223; host 210 creates the first table of first files 250. When the first files are stored in the host cache storage, the predicted compression rates and the predicted file sizes are calculated based on the relationship R(f). Then, the file sizes before compression, the predicted sizes after compression, and the predicted compression rates are stored in the first table of the first files. Table 3 shows an example of the first table of the first files. In an embodiment, a user may not want to change the order of some files or directories, and these files or directories may be registered in a group. The predicted post-compression size of the group is a sum of the predicted post-compression sizes of the files included in the group. An example of the group is shown as FileX.GROUP in Table 3.

TABLE 3

| File Name * | Number of Files Included (File Name) | Sizes before Compression (MB) | Predicted Sizes after Compression (MB) | Predicted Compression Rates (%) |
|---|---|---|---|---|
| File1.exe | 1 | 2500 | 1000 | 40 |
| File2.doc | 1 | 1000 | 600 | 60 |
| File3.txt | 1 | 1500 | 500 | 33 |
| File4.tar | 1 | 6000 | 3000 | 50 |
| File5.html | 1 | 500 | 100 | 20 |
| File6.jpg | 1 | 1000 | 800 | 80 |
| File7.bmp | 1 | 2000 | 1200 | 60 |
| ... | ... | ... | ... | ... |
| FileS.pdf | 1 | 1750 | 700 | 40 |
| ... | ... | ... | ... | ... |
| FileX.GROUP | 3 | 2200 | 1700 | 77 |
| (FileX.html) | 1 | 100 | 20 | 20 |
| (FileY.jpg) | 1 | 100 | 80 | 80 |
| (FileZ.mp4) | 1 | 2000 | 1600 | 80 |
| ... | ... | ... | ... | ... |

* This is a file identifier that can identify a file such as inode, file path + file name, etc.

Referring to FIG. 5, at step 503, the host classifies the predicted compression rates of the first files and registers the first files in a second table on the host, based on the predicted compression rates and predicted file sizes after compression of the first files. For example, in the embodiment shown in FIG. 2, host 210 classifies the predicted compression rates and register first files 250 in the second table. Table 4 shows an example of the second table of the first files. In the example of the second table (shown as Table 4), the predicted compression rates are classified into five stages.

TABLE 4

| Predicted Compression Rates (%) | Post-Compression Sizes | | | | | |
|---|---|---|---|---|---|---|
| | ~10 MB | ~50 MB | ~100 MB | ~500 MB | ~1 GB | ~2 GB |
| 0-15 | | | | | | |
| 15-35 | | | File5.html | File3.txt | | |
| 35-55 | | | | | File1.exe | |
| | | | | | FileS.pdf | |
| 55-75 | | | | | File2.doc | File7.bmp |
| | | | | | File6.jpg | |
| above 75 | | | | | FileX.GROUP | |

Referring to FIG. 5, at step 505, the host determines whether an average of the predicted compression rates of all the first files significantly deviates from a predetermined range. For example, in the embodiment shown in FIG. 2, host 210 determines whether the average of the predicted compression rates of all first files 250 significantly deviates from the predetermined range.

In the case of the IBM® TS1150 tape drive, the size of the buffer memory of the tape drive is 2 GB. Accordingly, for a file size after compression of 2 GB, if the average compression rate ($R_{avg}$) is close to 45%, then writing data can be continuously made at the fastest transfer speed. An actual compression rate of compressing a file by a tape drive is expected to fall in a range $R_{rng}$. $R_{rng}=[R_{min}, R_{max}]$, where $R_{min}$ is a minimum compression rate while $R_{max}$ is a maximum compression rate. As an example, $R_{rng}$ can be between 35% and 55%.

Figure 6:
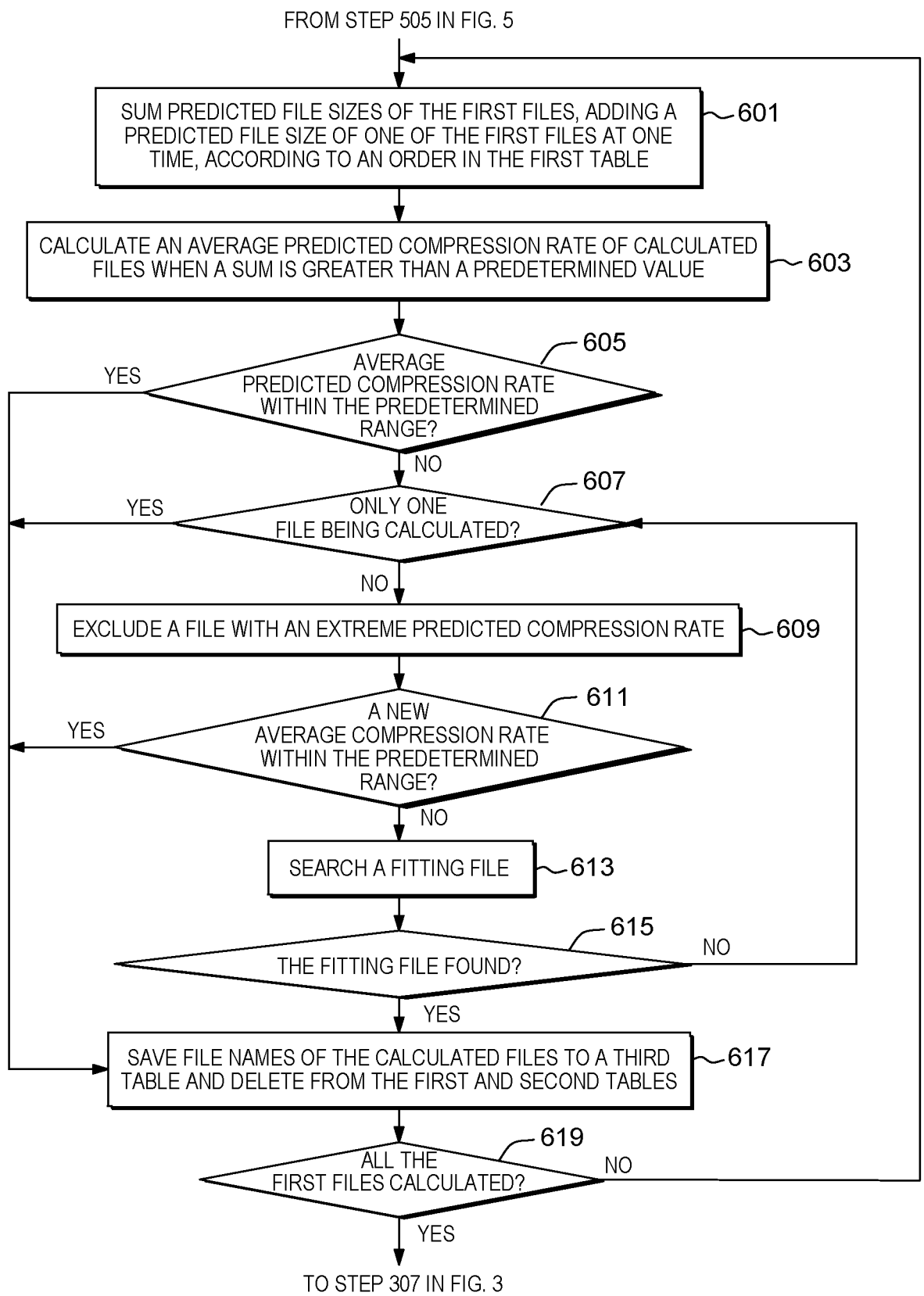
FIG. 6 presents a flowchart showing operational steps of reordering a sequence of files to be saved, in accordance with one embodiment of the present invention.

In response to the average of the predicted compression rates of all the first files significantly not deviating from the predetermined range $R_{rng}$ (NO branch of block 505), the host runs steps 601-619 shown in FIG. 6 to reorder the sequence of the first files stored in the host cache storage. In response to the average of the predicted compression rates of all the first files significantly deviating from the predetermined range $R_{rng}$ (YES branch of block 505), the host does not run steps 601-619 shown in FIG. 6 for reordering the sequence of the first files stored in the host cache storage. For example, if the average compression rate is lower than 20% or higher than 70%, then the reordering will not be performed because meaningful effects cannot be expected by the reordering.

FIG. 6 presents a flowchart showing operational steps of reordering the sequence of the first files stored in the host cache storage and generating the new sequence of transferring the first files from the host cache storage to a first tape drive hosting the first tape, in accordance with one embodiment of the present invention.

Referring to FIG. 6, at step 601, the host sums the predicted file sizes of the first files. During the calculation, the host adds a predicted file size of one of the first files at one time, according to an order in the first table. For example, in the embodiment shown in FIG. 2, host 210 sums the predicted file sizes of first files 250 stored in host cache storage 240. After a file is added, the host sets a flag in the second table, marking the file as "calculated", in order to prevent double calculation of the file.

If the predicted file size of a sole file is greater than a predetermined value (e.g., 2 GB), the file name of the sole file is saved to the third table and deleted from the first table and the second table, in order to prevent the sole file from being split. In an example shown in FIG. 7, File4 along is greater than the predetermined value (e.g., 2 GB) and therefore its file name is saved into the third table and removed from the first table and the second table. An example of the third table is shown in Table 5.

At step 603, the host calculates an average predicted compression rate ($R_{sum}$) of calculated files, after n files have been calculated and a sum of the n calculated files is greater than the predetermined value (e.g., 2 GB). The calculation of the average predicted compression rate is as follows.

Size before compression of an $i$-th file $F_i$:$N_i$.

Sum of sizes before compression: $N_{sum[1,n]}=\Sigma_{i=1}^{n}N_i$

Sum of predicted sizes after compression:
$C_{sum[1,n]}=\Sigma_{i=1}^{n}N_iR(f_i)$ Average predicted compression rate: $R_{sum[1,n]}=C_{sum[1,n]}/N_{sum[1,n]}$ Referring to FIG. 6, at step 605, the host determines whether the average predicted compression rate ($R_{sum[1,n]}$) is within a predetermined range ($R_{rng}=[R_{min}, R_{max}]$). As an example, the predetermined range may be between 35% and 55%. In response to the average predicted compression rate being within the predetermined range (YES branch of block 605), the host runs step 617 to save file names of the n calculated files to a third table and delete them from the first table and the second table. The third table is a list of the first files waiting to be saved to the first tape and provides the new sequence of transferring the first files from the host cache storage to the first tape drive. In an example shown in FIG. 7, a sum of the predicted file sizes of File1, File2, and File3 is greater than the predetermined value (e.g., 2 GB) and an average predicted compression rate of the three files is within the predetermined range $R_{rng}$; therefore, file names of File1, File2, and File3 are saved to the third table. When the file names of the three files are saved, they are saved in an order in the third table same as in the first table. An example of the third table is shown in Table 5.

In response to the average predicted compression rate being not within the predetermined range (NO branch of block 605), at step 607, the host determines whether only one file is being calculated. In response to the only one file being calculated, the host runs step 617 to save the file name of the only one file to the third table and delete it from the first table and the second table. An example of the third table is shown in Table 5.

In response to not only one file being calculated, at step 609, the host excludes a file with an extreme predicted compression rate (which is either higher than $R_{max}$ or lower than $R_{min}$) from the calculated files. The file name of the file with the extreme predicted compression rate is not saved to the third table and is not removed from the first table and second table. For example, shown in FIG. 7, a sum of the predicted file sizes of File5, File6, and File7 is greater than the predetermined value (e.g., 2 GB) and an average predicted compression rate of the three files is not within the predetermined range $R_{rng}$, more particularly higher than $R_{max}$; the predicted compression rate of File6 is the highest and is excluded from the three calculated files. Therefore, File6 is not saved to the third table and is not removed from the first table and second table. Similarly, the sum of the predicted file sizes of File5, File6, and File7 is greater than the predetermined value (e.g., 2 GB) and the average predicted compression rate of the three files is not within the predetermined range $R_{rng}$, more particularly lower than $R_{min}$; the predicted compression rate of File6 is the lowest and therefore File6 is excluded from the three calculated files.

Figure 7:
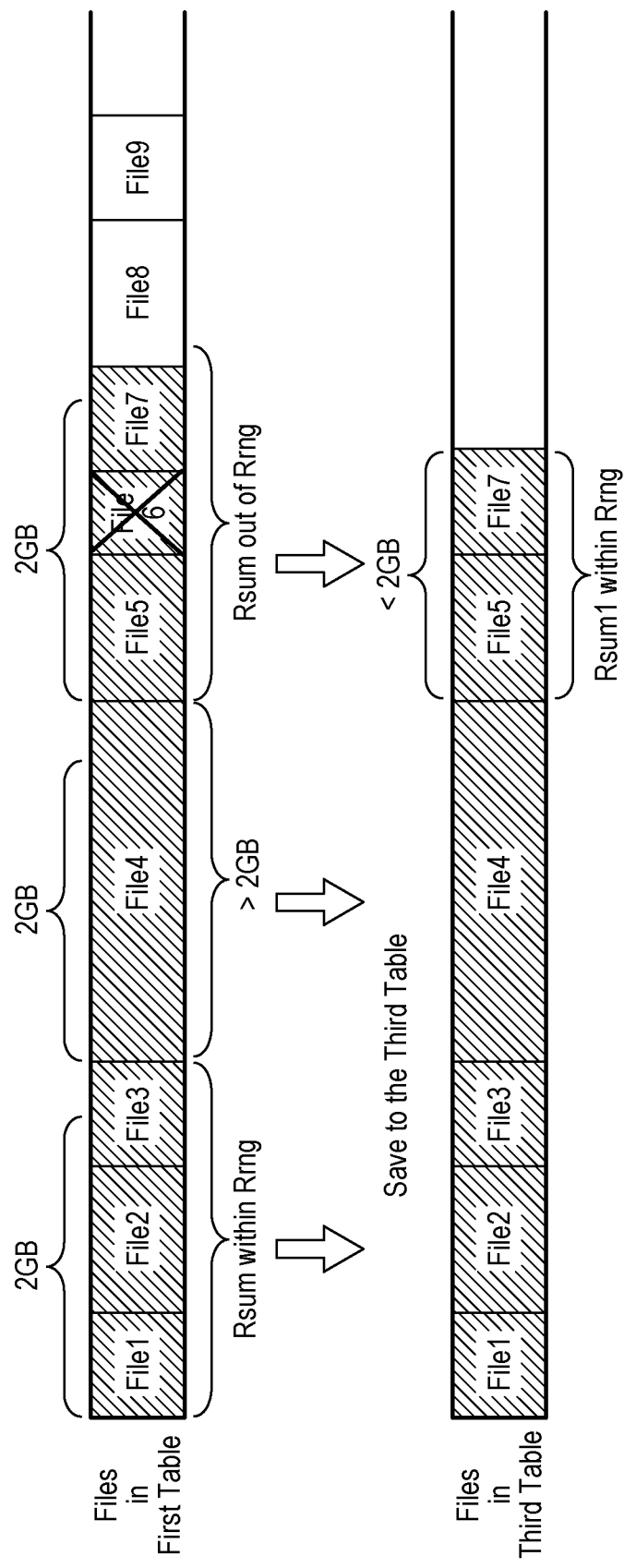
FIG. 7-FIG. 10 are diagrams illustrating an example of reordering a sequence of files to be saved, in accordance with one embodiment of the present invention.

An exclusion counter in the first table is incremented by 1 for the excluded file (for example, File 6 shown in FIG. 7). When the exclusion counter exceeded a predetermined threshold, a file with a second highest predicted compression rate or a second smallest predicted compression rate, instead of the file with the highest or lowest predicted compression rate (for example, File 6 shown in FIG. 7), is excluded. Therefore, the file with the highest or lowest predicted compression rate will not be left in the host cache storage forever.

When the file with the extreme predicted compression rate is excluded, a new average predicted compression rate is calculated for remaining calculated files. In the example shown in FIG. 7, the average predicted compression rate of File5 and File 7 is calculated. The calculation of the new average predicted compression rate (calculated for the remaining calculated files) is as follows. Before the calculation of the new average predicted compression rate, the "calculated" flags are reset in the second table.

Size before compression of the excluded file $f_h$:$N_h$.

Sum of sizes before compression:
$N_{sum1[1,n]} = \Sigma_{i=1}^{n} N_i - N_h$

Sum of predicted sizes after compression:
$C_{sum1[1,n]} = \Sigma_{i=1}^{n} N_i R(f_i) - N_h R(f_h)$ Average predicted compression rate:
$R_{sum1[1,n]} = = C_{sum1[1,n]} / N_{sum1[1,n]}$ At step 611, the host determines whether the new average predicted compression rate ($R_{sum1}$) (calculated for the remaining calculated files) is within the predetermined range ($R_{rng} = [R_{min}, R_{max}]$). In response to the new average predicted compression rate (calculated for the remaining files) being within the predetermined range (YES branch of block 611), the host runs step 617 to save file names of the remaining calculated files to the third table and delete them from the first table and the second table. In the example shown in FIG. 7, the host save file names of File5 and File7 to the third table and delete them from the first table and the second table. An example of the third table is shown in Table 5.

In response to the new average predicted compression rate files ($R_{sum1}$) (calculated for the remaining calculated files) being not within the predetermined range (NO branch of block 611), at step 613, the host searches a fitting file in the first table and calculates the fitting file with the remaining calculated files, and the host determines whether the fitting file satisfies that a sum of predicted file sizes after compression of the fitting file and the remaining calculated files is less than or equal to the predetermined value (e.g., 2 GB) and an average predicted compression rate of the fitting file and the remaining calculated files is within the predetermined range ($R_{rng} = [R_{min}, R_{max}]$).

Figure 8:
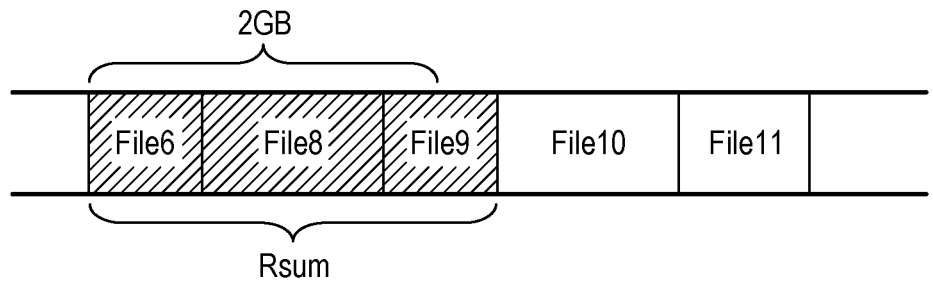
Figure 9:
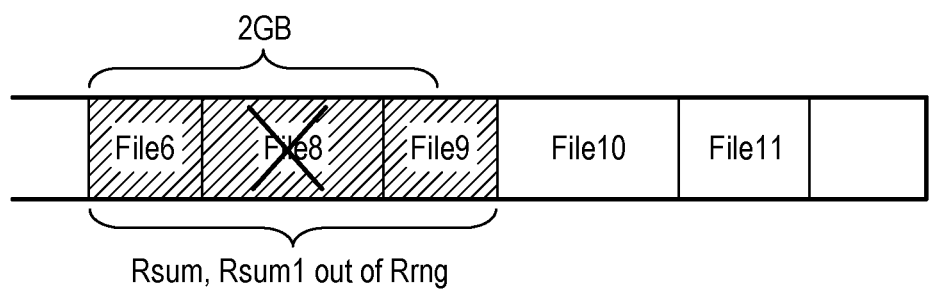

As shown in FIG. 8, a sum of predicted file sizes of the fitting file File8 and the remaining files File6 and File9 is greater than the predetermined value (e.g., 2 GB) and an average predicted compression rate of them is not within the predetermined range ($R_{rng} = [R_{min}, R_{max}]$). Therefore, File8 does not satisfies the requirements and cannot be selected as the fitting file.

Figure 10:
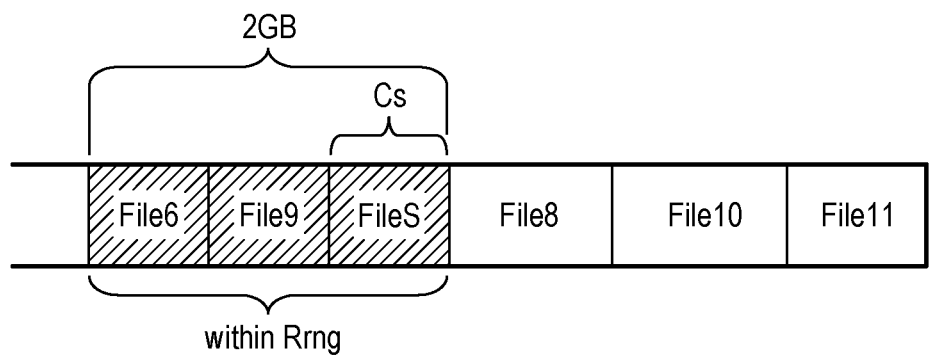

As shown in FIG. 10, the host selects File5 from the first table as the fitting file. The host determines that a sum of predicted file sizes of the fitting file File5 and the remaining calculated files File6 and File9 is less than or equal to the predetermined value (e.g., 2 GB) and an average predicted compression rate of them is within the predetermined range ($R_{rng} = [R_{min}, R_{max}]$). Therefore, File5 satisfies the requirements for the fitting file.

The condition of a satisfying fitting file such as File5 is derived as follows. Assuming that the predetermined value is 2 GB.

Since the predicted file size of File5 ($C_S$) needs to be smaller than 2 GB-$C_{sum1}$, $$C_s \leq 2 \text{ GB} - C_{sum1}$$

needs to be satisfied. Further, the average compression rate needs to fall within the range of $R_{rng}$. Thus, $$R_{min} \leq \frac{C_{sum1} + C_s}{N_{sum1} + N_s} \leq R_{max}$$

Since $C_S = N_s R_S$, $$R_{min} \leq \frac{C_{sum1} + C_s}{N_{sum1} + C_s/R_s} \leq R_{max}$$

Finally, the predicted compression rate of File5 ($R_S$) must satisfy the following expression:

$$\frac{C_s}{(C_{sum1} + C_s)/R_{min} - N_{sum1}} \leq R_s \leq \frac{C_s}{(C_{sum1} + C_s)/R_{max} - N_{sum1}}$$

The above expression of the predicted compression rate of File5 ($R_S$) and the predicted file size of File5 ($C_S$) defines a condition that the fitting file must satisfy. Therefore, the host searches in the columns of the second table to find the fitting file satisfying the condition. As a result, the host determines that File5 satisfies the condition and is found as the fitting file.

If no file in the second table satisfies the condition, the host decreases the lower limit in the expression of the predicted compression rate of File5 ($R_S$) and the predicted file size of File5 ($C_S$) in order to obtain the fitting file.

In response to the fitting file being found in the second table (YES branch of block 615), the host runs step 617 to save file names of the fitting file and the remaining calculated files to the third table and delete them from the first table and the second table. For example, as shown in FIG. 10, the host saves file names of File5, File6, and File9 to the third table and removes them from the first table and second table. An example of the third table is shown in Table 5.

In response to the fitting file being not found in the second table (NO branch of block 615), the host reiterates steps 607-615. In the reiteration, the host excludes another file with the second highest predicted compression rate or the second smallest predicted compression rate.

Referring to FIG. 6, at step 619, the host determines whether all the first files are calculated. In response to not all the first files being calculated (NO branch of block 619), the host reiterates steps 601-619. Before the reiteration, the host resets the "calculated" flags in the second table. In response to all the first files being calculated (YES branch of block 619), the host runs steps 307 and 309 shown in FIG. 3: the host transfers the first files from the host cache storage to the first tape drive and writes the first files to the first tape, in an order given in the third table.

TABLE 5

| File Names | Sizes before Compression (MB) | Predicted Sizes after Compression (MB) | Predicted Compression Rate (%) |
|---|---|---|---|
| File1.exe | 2500 | 1000 | 40 |
| File2.doc | 1000 | 600 | 60 |
| File3.txt | 1500 | 500 | 33 |
| File4.tar | 6000 | 3000 | 50 |
| File5.html | 500 | 100 | 20 |
| File7.pdf | 2000 | 1200 | 60 |
| File6.bmp | 1000 | 800 | 80 |
| File9.txt | 1500 | 500 | 33 |
| FileS.exe | 1750 | 700 | 40 |
| ... | ... | ... | ... |

Some additional considerations in the disclosed approach are as follows. (1) Determining the predicted compression rate may be performed, for example, by using general statistical information from the file extension (e.g., 20% for .txt, 100% for .lzh, etc.). (2) The relationship between the compression rates and the file attributes can be dynamically calculated or previously measured rates can be held in a static manner. Also, they may be used in combination. (3) In the example given previously in this document, the classification is made based on the file extensions; however, the file attributions are not limited to file extensions. The disclosed approach can be implemented on a virtual volume of a storage system or data blocks of a file system, as long as the classification of the compression rate is possible. (4) With regard to files in the host cache storage, all the files may be temporarily accumulated by saving by periodical backup and then subjected to the calculation. Alternatively, when a certain number of files are accumulated in it, they may be saved in the host cache storage, and simultaneously calculation and saving to the tape may be performed. (5) If a standard deviation of compression rates is calculated in advance such that the reordering does not take place, then it is also possible to omit the reordering, in a case where the standard deviation is small (or in a case where there is no imbalance in the order of the compression rates of the files).

The time needed in reordering according to the disclosed approach will be defined as follows, assuming that the average size of the files is, for example, 1 MB. The number of files that can be stored in 2 GB of the buffer memory is 2000. It is assumed that files of 10 GB are reordering candidates and the maximum 10000 files are to be reordered. The number of rounds of sorting of the file number N is in the order of O(N). The reordering of 10000 files in the case of experimentation by a PC takes time in the order of milliseconds. The native data capacity of the JD cartridge of the IBM® TS1150 tape drive is 10 TB and the calculation by 2 GB will be repeated for 2000 rounds. Since one round takes several milliseconds, reordering for the entire tape will only add up to several seconds. Calculation for comparison only involves simple operation by four basic arithmetic operators using two expressions from multiple expressions and does not necessitate calculation for comparison on all of the files. Accordingly, even when that portion is added, the time will not become significantly longer beyond this. It takes 2 GB/360 MB/s=5.5 seconds at the fastest and 10 TB/360 MB/s=7.7 hours for the entire tape to write the reordered 2 GB. Reordering as such does not need to be performed while data is being written to the tape, and reordering should be carried out while the files are being accumulated in the host cache storage. Even when reordering is performed while data is being written, it will not take any problematic length of time because it only takes several seconds while writing of data to the entire tape takes 7.7 hours.

In an alternative approach (which is used to be compared with the disclosed approach in the present invention), files are compressed by the host without reordering the files. The downside of this alternative approach is lack of compatibility. The algorithm of compression is more complicated than that of reordering. Two GB software-based compression takes several minutes on a PC and compression of data of 10 TB corresponding to one tape takes several hours. The compression speed is in the order of several MB to several tens of MB per second and the load on the host is large. If compression and decompression are performed while data is being read from or written to the tape, the transfer speed and performance of other applications running on the PC are compromised. As an example of hardware-based compression on the host, file compression is performed using a Coherent Accelerator Processor Interface (CAPI) Compression Accelerator Adapter of POWER8. A compression speed of 2 GB/s can be achieved and 10 TB can be compressed in about 80 minutes. However, when data is read by another system, the data cannot be decompressed. Further, decompression after reading of the data will take the same period of time. If the transfer speed is low, data should be preferably transferred after being compressed by hardware-based compression by the host; however, the transfer speed of a tape drive is high in the order of 800 MB/s and compression before transfer is not always necessary. To perform compression on the side of the host involves the disadvantage that the compression compatibility among open systems is lost or that the decompression takes time when data is read by the host that does not have a compression hardware engine and thus this is not realistic.

The disclosed approach in the present invention will achieve its intended effects in a case where a large amount of files can be stored in the host cache such as disk storage while the number of tape drives is limited in the context of saving to a tape. An environment may be considered where the tape storage is shared by multiple systems. For example, IBM® Spectrum® Archive Enterprise Edition includes multiple nodes and a grid of multiple IBM® TS7700 systems, and one physical tape that is only connected to one single cluster.

Figure 11:
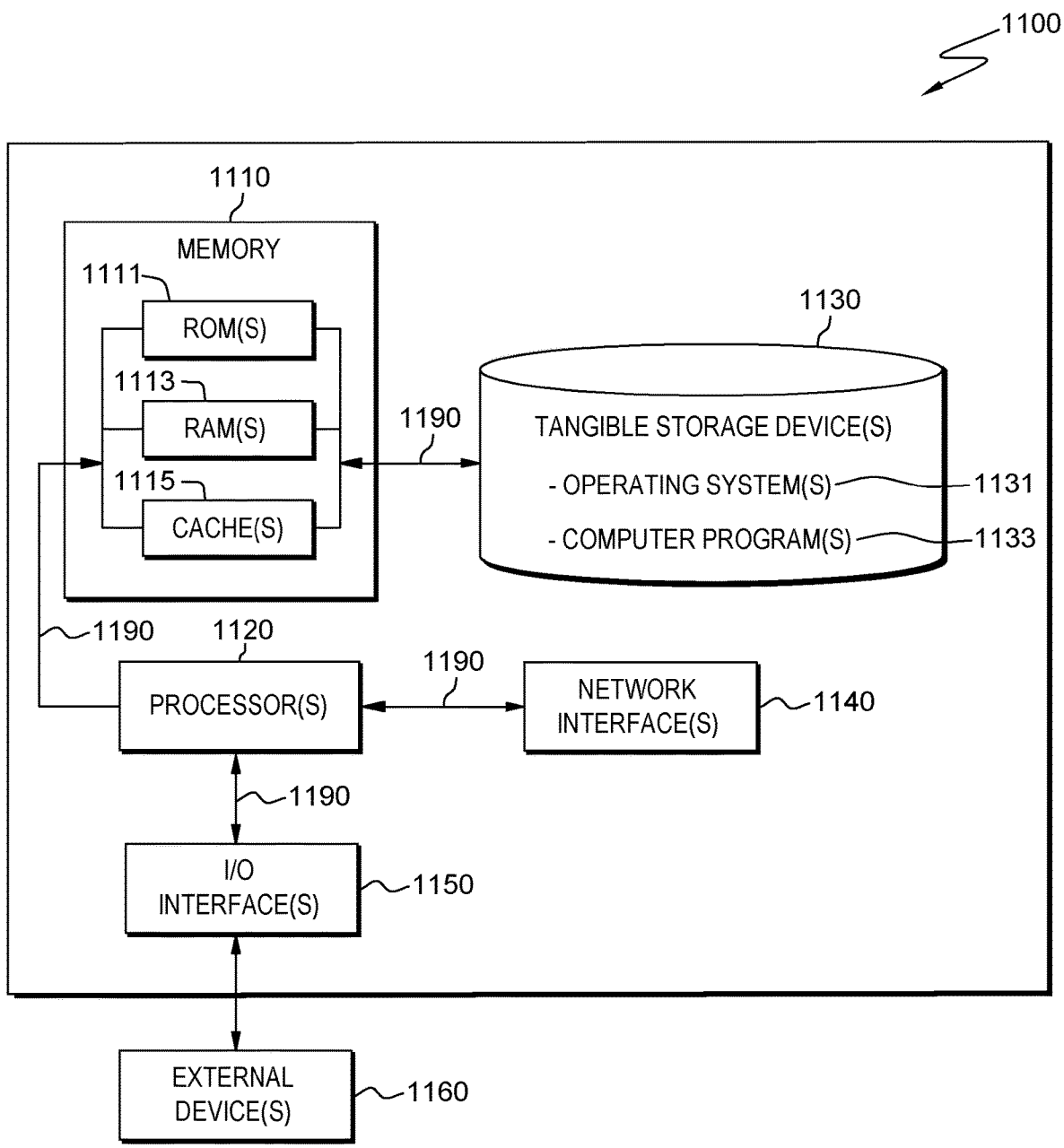
FIG. 11 is a diagram illustrating components of a computing system, in accordance with one embodiment of the present invention.

FIG. 11 is a diagram illustrating components of computing system 1100, in accordance with one embodiment of the present invention. It should be appreciated that FIG. 11 provides only an illustration of one implementation and does not imply any limitations with regard to the environment in which different embodiments may be implemented.

Referring to FIG. 11, computing device 1100 includes processor(s) 1120, memory 1110, and tangible storage device(s) 1130. In FIG. 11, communications among the above-mentioned components of computing device 1100 are denoted by numeral 1190. Memory 1110 includes ROM(s)

(Read Only Memory) 1111, RAM(s) (Random Access Memory) 1113, and cache(s) 1115. One or more operating systems 1131 and one or more computer programs 1133 reside on one or more computer readable tangible storage device(s) 1130.

Computing device 1100 further includes I/O interface(s) 1150. I/O interface(s) 1150 allows for input and output of data with external device(s) 1160 that may be connected to computing device 1100. Computing device 1100 further includes network interface(s) 1140 for communications between computing device 1100 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, the computer-implemented method comprising:
   determining, by a host, predicted compression rates of first files that are to be saved to a first tape, based on a relationship between compression rates and file attributes of second files that have been saved on a second tape, wherein the predicted compression rates are expected to be achieved by compression on a tape drive hosting the first tape;
   reordering, by the host, a sequence of the first files stored in host cache storage, to generate a new sequence of transferring the first files from the host cache storage to the tape drive hosting the first tape, based on the predicted compression rates of the first files;
   transferring, by the host, the first files from the host cache storage to the tape drive hosting the first tape, according to the new sequence; and
   writing, by the host, the first files to the first tape, according to the new sequence.

2. The computer-implemented method of claim 1, further comprising:
   calculating, by the host, the compression rates of the second files; and
   determining, by the host, the relationship between the compression rates and the file attributes of the second files.

3. The computer-implemented method of claim 1, further comprising:
   creating on the host, by the host, a first table of the first files;
   classifying, by the host, the predicted compression rates of the first files and registering the first files in a second table on the host, based on the predicted compression rates and predicted file sizes after compression of the first files;
   determining, by the host, whether an average of the predicted compression rates of the first files significantly deviates from a predetermined range; and
   in response to the average of the predicted compression rates of the first files not significantly deviating from the predetermined range, running, by the host, steps of reordering the sequence of the first files stored in the host cache storage.

4. The computer-implemented method of claim 3, further comprising:
   summing, by the host, the predicted file sizes after compression of the first files, adding a predicted file size after compression of one of the first files at one time, according to an order in the first table;
   calculating, by the host, an average predicted compression rate of calculated files when a sum of predicted file sizes after compression of the calculated files is greater than a predetermined value;
   determining, by the host, whether the average predicted compression rate of the calculated files is within the predetermined range;
   in response to the average predicted compression rate of the calculated files being within the predetermined range, saving, by the host, file names of the calculated files to a third table and deleting the file names of the calculated files from the first table and the second table; and
   wherein the third table is a list of the first files in the new sequence of transferring the first files from the host cache storage to the tape drive hosting the first tape.

5. The computer-implemented method of claim 4, further comprising:
   in response to the average predicted compression rate of the calculated files being not within the predetermined range, determining, by the host, whether only one file is being calculated; and
   in response to the only one file being calculated, saving, by the host, a file name of the only one file to the third table and deleting the file name of the only one file from the first table and the second table.

6. The computer-implemented method of claim 5, further comprising:
   in response to not only one file being calculated, excluding, by the host, a file with an extreme predicted compression rate from the calculated files;
   calculating, by the host, an average predicted compression rate of remaining calculated files;
   determining, by the host, whether the average predicted compression rate of the remaining calculated files is within the predetermined range; and
   in response to the average predicted compression rate of the remaining calculated files being within the predetermined range, saving, by the host, file names of the remaining calculated files to the third table and deleting the file names of the remaining calculated files from the first table and the second table.

7. The computer-implemented method of claim 6, further comprising:
   in response to the average predicted compression rate of the remaining calculated files being not within the predetermined range, searching, by the host, a fitting file in the second table;
   determining, by the host, whether the fitting file satisfies that a sum of predicted file sizes after compression of the fitting file and the remaining calculated files is less than or equal to the predetermined value and an average predicted compression rate of the fitting file and the remaining calculated files is within the predetermined range; and
   in response to the fitting file being found, saving, by the host, file names of the fitting file and the remaining calculated files to the third table and deleting the file names of the fitting file and the remaining calculated files from the first table and the second table.

8. A computer program product, the computer program product comprising one or more computer-readable tangible storage devices and program instructions stored on at least one of the one or more computer-readable tangible storage devices, the program instructions executable to:
   determine, by a host, predicted compression rates of first files that are to be saved to a first tape, based on a relationship between compression rates and file attributes of second files that have been saved on a second tape, wherein the predicted compression rates are expected to be achieved by compression on a tape drive hosting the first tape;
   reorder, by the host, a sequence of the first files stored in host cache storage, to generate a new sequence of transferring the first files from the host cache storage to the tape drive hosting the first tape, based on the predicted compression rates of the first files;
   transfer, by the host, the first files from the host cache storage to the tape drive hosting the first tape, according to the new sequence; and write, by the host, the first files to the first tape, according to the new sequence.

9. The computer program product of claim 8, further comprising the program instructions executable to:
calculate, by the host, the compression rates of the second files; and
determine, by the host, the relationship between the compression rates and the file attributes of the second files.

10. The computer program product of claim 8, further comprising the program instructions executable to:
create on the host, by the host, a first table of the first files;
classify, by the host, the predicted compression rates of the first files and register the first files in a second table on the host, based on the predicted compression rates and predicted file sizes after compression of the first files;
determine, by the host, whether an average of the predicted compression rates of the first files significantly deviates from a predetermined range; and
in response to the average of the predicted compression rates of the first files not significantly deviating from the predetermined range, run, by the host, steps of reordering the sequence of the first files stored in the host cache storage.

11. The computer program product of claim 10, further comprising the program instructions executable to:
sum, by the host, the predicted file sizes after compression of the first files, add a predicted file size after compression of one of the first files at one time, according to an order in the first table;
calculate, by the host, an average predicted compression rate of calculated files when a sum of predicted file sizes after compression of the calculated files is greater than a predetermined value;
determine, by the host, whether the average predicted compression rate of the calculated files is within the predetermined range;
in response to the average predicted compression rate of the calculated files being within the predetermined range, save, by the host, file names of the calculated files to a third table and delete the file names of the calculated files from the first table and the second table; and
wherein the third table is a list of the first files in the new sequence of transferring the first files from the host cache storage to the tape drive hosting the first tape.

12. The computer program product of claim 11, further comprising the program instructions executable to:
in response to the average predicted compression rate of the calculated files being not within the predetermined range, determine, by the host, whether only one file is being calculated; and
in response to the only one file being calculated, save, by the host, a file name of the only one file to the third table and delete the file name of the only one file from the first table and the second table.

13. The computer program product of claim 12, further comprising the program instructions executable to:
in response to not only one file being calculated, exclude, by the host, a file with an extreme predicted compression rate from the calculated files;
calculate, by the host, an average predicted compression rate of remaining calculated files;
determine, by the host, whether the average predicted compression rate of the remaining calculated files is within the predetermined range; and in response to the average predicted compression rate of the remaining calculated files being within the predetermined range, save, by the host, file names of the remaining calculated files to the third table and delete the file names of the remaining calculated files from the first table and the second table.

14. The computer program product of claim 13, further comprising the program instructions executable to:
in response to the average predicted compression rate of the remaining calculated files being not within the predetermined range, search, by the host, a fitting file in the second table;
determine, by the host, whether the fitting file satisfies that a sum of predicted file sizes after compression of the fitting file and the remaining calculated files is less than or equal to the predetermined value and an average predicted compression rate of the fitting file and the remaining calculated files is within the predetermined range; and
in response to the fitting file being found, save, by the host, file names of the fitting file and the remaining calculated files to the third table and delete the file names of the fitting file and the remaining calculated files from the first table and the second table.

15. A computer system, the computer system comprising:
one or more processors, one or more computer readable tangible storage devices, and program instructions stored on at least one of the one or more computer readable tangible storage devices for execution by at least one of the one or more processors, the program instructions executable to:
determine, by a host, predicted compression rates of first files that are to be saved to a first tape, based on a relationship between compression rates and file attributes of second files that have been saved on a second tape, wherein the predicted compression rates are expected to be achieved by compression on a tape drive hosting the first tape;
reorder, by the host, a sequence of the first files stored in host cache storage, to generate a new sequence of transferring the first files from the host cache storage to the tape drive hosting the first tape, based on the predicted compression rates of the first files;
transfer, by the host, the first files from the host cache storage to the tape drive hosting the first tape, according to the new sequence; and
write, by the host, the first files to the first tape, according to the new sequence.

16. The computer system of claim 15, further comprising the program instructions executable to:
calculate, by the host, the compression rates of the second files; and
determine, by the host, the relationship between the compression rates and the file attributes of the second files.

17. The computer system of claim 15, further comprising the program instructions executable to:
create on the host, by the host, a first table of the first files;
classify, by the host, the predicted compression rates of the first files and register the first files in a second table on the host, based on the predicted compression rates and predicted file sizes after compression of the first files;
determine, by the host, whether an average of the predicted compression rates of the first files significantly deviates from a predetermined range; and in response to the average of the predicted compression rates of the first files not significantly deviating from the predetermined range, run, by the host, steps of reordering the sequence of the first files stored in the host cache storage.

18. The computer system of claim 17, further comprising the program instructions executable to:
sum, by the host, the predicted file sizes after compression of the first files, add a predicted file size after compression of one of the first files at one time, according to an order in the first table;
calculate, by the host, an average predicted compression rate of calculated files when a sum of predicted file sizes after compression of the calculated files is greater than a predetermined value;
determine, by the host, whether the average predicted compression rate of the calculated files is within the predetermined range;
in response to the average predicted compression rate of the calculated files being within the predetermined range, save, by the host, file names of the calculated files to a third table and delete the file names of the calculated files from the first table and the second table; and
wherein the third table is a list of the first files in the new sequence of transferring the first files from the host cache storage to the tape drive hosting the first tape.

19. The computer system of claim 18, further comprising the program instructions executable to:
in response to the average predicted compression rate of the calculated files being not within the predetermined range, determine, by the host, whether only one file is being calculated;
in response to the only one file being calculated, save, by the host, a file name of the only one file to the third table and delete the file name of the only one file from the first table and the second table;
in response to not only one file being calculated, exclude, by the host, a file with an extreme predicted compression rate from the calculated files;
calculate, by the host, an average predicted compression rate of remaining calculated files;
determine, by the host, whether the average predicted compression rate of the remaining calculated files is within the predetermined range; and
in response to the average predicted compression rate of the remaining calculated files being within the predetermined range, save, by the host, file names of the remaining calculated files to the third table and delete the file names of the remaining calculated files from the first table and the second table.

20. The computer system of claim 19, further comprising the program instructions executable to:
in response to the average predicted compression rate of the remaining calculated files being not within the predetermined range, search, by the host, a fitting file in the second table;
determine, by the host, whether the fitting file satisfies that a sum of predicted file sizes after compression of the fitting file and the remaining calculated files is less than or equal to the predetermined value and an average predicted compression rate of the fitting file and the remaining calculated files is within the predetermined range; and
in response to the fitting file being found, save, by the host, file names of the fitting file and the remaining calculated files to the third table and delete the file names of the fitting file and the remaining calculated files from the first table and the second table.

\* \* \* \* \*